US009620831B2

(12) United States Patent
Brandstaetter et al.

(10) Patent No.: US 9,620,831 B2
(45) Date of Patent: Apr. 11, 2017

(54) COOLING ELEMENT AND BATTERY SYSTEM

(71) Applicant: Samsung SDI Co., Ltd., Yongin-si, Gyeonggi-do (KR)

(72) Inventors: Stefan Brandstaetter, Judendorf-Strassengel (AT); Thomas Hoermann, Graz (AT); Stefan Roepke, Graz (AT)

(73) Assignee: Samsung SDI Co., Ltd., Yongin-si (KR)

( * ) Notice: Subject to any disclaimer, the term of this patent is extended or adjusted under 35 U.S.C. 154(b) by 12 days.

(21) Appl. No.: 14/682,300

(22) Filed: Apr. 9, 2015

(65) Prior Publication Data

US 2015/0295288 A1 Oct. 15, 2015

(30) Foreign Application Priority Data

Apr. 9, 2014 (EP) .................................... 14164103

(51) Int. Cl.
| | |
|---|---|
| *H01M 10/65* | (2014.01) |
| *H01M 10/6572* | (2014.01) |
| *H01M 10/6556* | (2014.01) |
| *H01M 10/613* | (2014.01) |
| *H01M 10/625* | (2014.01) |
| *H01M 10/658* | (2014.01) |
| *F25B 21/02* | (2006.01) |
| *H01M 6/50* | (2006.01) |
| *H01M 10/6567* | (2014.01) |

(52) U.S. Cl.
CPC ......... *H01M 10/6572* (2015.04); *F25B 21/02* (2013.01); *H01M 6/5038* (2013.01); *H01M 10/613* (2015.04); *H01M 10/625* (2015.04); *H01M 10/658* (2015.04); *H01M 10/6556* (2015.04); *H01M 10/6567* (2015.04); *H01M 2220/20* (2013.01)

(58) Field of Classification Search
CPC ........... H01M 10/6572; H01M 10/613; H01M 10/625; H01M 10/6567; H01M 10/6556
See application file for complete search history.

(56) References Cited

U.S. PATENT DOCUMENTS

2011/0179807 A1* 7/2011 Holloway ............. F24F 5/0017
62/3.62
2014/0013774 A1* 1/2014 Grunwald ............... F25B 21/02
62/3.2

FOREIGN PATENT DOCUMENTS

| | | |
|---|---|---|
| DE | 102009005853 A1 | 7/2010 |
| DE | 102012103131 A1 | 10/2013 |
| JP | 2009152440 A | 7/2009 |
| JP | 2012195210 A | 10/2012 |

(Continued)

*Primary Examiner* — Emily Le
*Assistant Examiner* — Monique Wills
(74) *Attorney, Agent, or Firm* — Lewis Roca Rothgerber Christie LLP

(57) ABSTRACT

A cooling element to cool a component of a battery system, and a battery system having at least on cooling element. The cooling element includes a top cooling element part, a bottom cooling element part spatially under the top cooling element part, at least one cooling duct between the top cooling element part and the bottom cooling element part, and through which a cooling medium is to flow, and a Peltier element arranged resting against the bottom cooling element part so as to lie at least partially at the height of the at least one cooling duct.

19 Claims, 1 Drawing Sheet

(56) References Cited

FOREIGN PATENT DOCUMENTS

WO      2012/124446 A1    9/2012
WO      2013/113618 A1    8/2013

\* cited by examiner

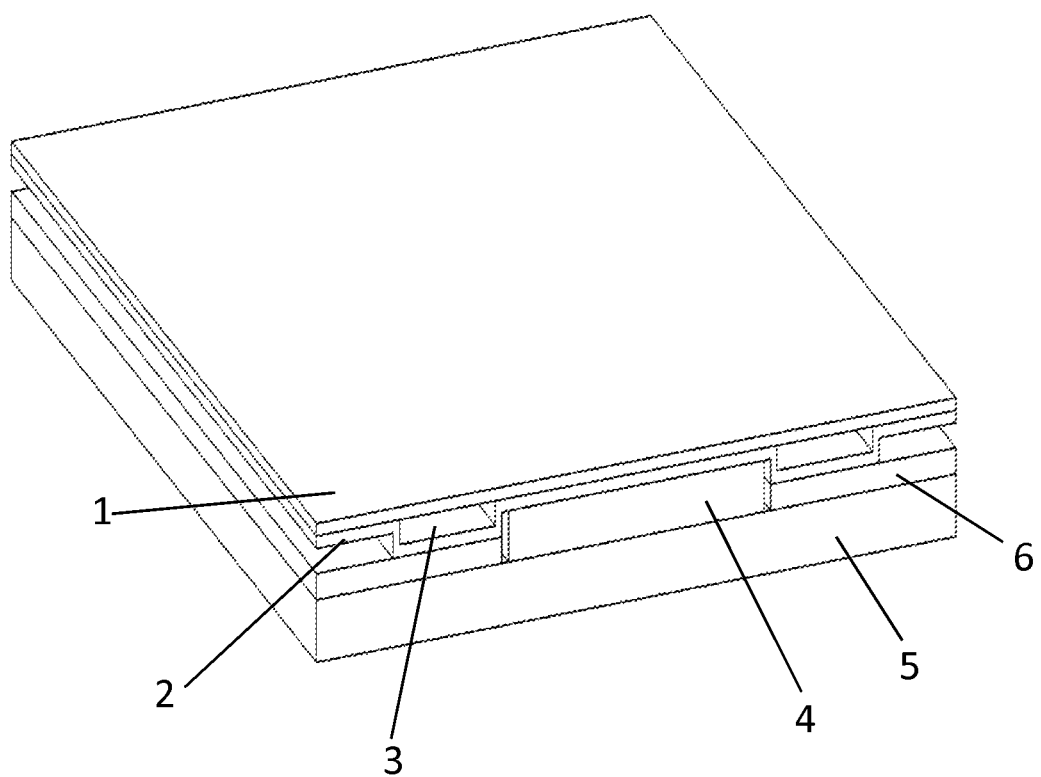

COOLING ELEMENT AND BATTERY SYSTEM

CROSS-REFERENCE TO RELATED APPLICATIONS

The present application claims priority 35 U.S.C. §119 to European Patent Publication No. EP 14164103.5 (filed on Apr. 9, 2014) which is hereby incorporated by reference in its entirety.

TECHNICAL FIELD

Embodiments relate to a cooling element to cool a component of a battery system and to a corresponding battery system having such a cooling element.

BACKGROUND

Cooling elements to cool a component of a battery system are sufficiently known and serve for discharging undesirable heat which arises when the battery system is in operation. For this purpose, a cooling element may be formed by cooling ducts. Via the cooling ducts, a cooling medium, such as, for example, water, is capable of flowing therethrough, so that, for example, heat from battery cells resting against the cooling element is transferred to the cooling element, and further on to the cooling medium and is then discharged out of the surroundings of the battery cells by the flow of cooling medium. The cooling medium itself may be cooled, for example, via an air-conditioning circuit in a vehicle, in which case, however, a corresponding air-conditioning unit has to be present and the tie-up to an air-conditioning circuit is complicated.

It is known, on the other hand, that Peltier elements may be used in order to cool a battery system. Thus, German Patent Publication No. DE 10 2009 005 853 A1 discloses a battery system which comprises at least one battery and, furthermore, comprises at least one Peltier element which serves for cooling and/or heating at least one battery.

German Patent Publication No. DE 10 2012 103 131 A1 discloses a motor vehicle having a vehicle battery, the vehicle battery being coolable via at least one Peltier element assigned to the vehicle battery. However, cooling solely by Peltier elements is not very efficient.

A simple combination of a cooling element having cooling ducts, on the one hand, with additional cooling by Peltier elements, on the other hand, would necessitate an undesirably large construction space in, for example, a motor vehicle.

SUMMARY

Embodiments relate to a cooling element to cool a component of a battery system, and a corresponding battery system which allows efficient cooling, along with small construction space.

In accordance with embodiments, a cooling element to cool a component of a battery system, includes at least one of: a top cooling element part, a bottom cooling element part, at least one cooling duct, through which a cooling medium is capable of flowing, is arranged between the top cooling element part and bottom cooling element part, a Peltier element is arranged, resting against the bottom cooling element part, so as to lie at least partially at the height of the cooling duct.

In accordance with embodiments, the expression "height" in this case refers to the "vertical" extent of the usually sheet-like cooling element. Meaning, to the direction of connection between the top cooling element part and bottom cooling element part, the direction standing essentially perpendicularly to the top cooling element part and bottom cooling element part. The expressions "top" and "bottom" of the "top cooling element part" and "bottom cooling element part" refer, in turn, to the orientation, illustrated herein, of the cooling element. The cooling element may, of course, also be used in a different orientation.

That the Peltier element used for cooling is arranged such that it lies at least partially at the height of the cooling duct means that the cooling duct and the Peltier element spatially overlap one another at least partially in the height direction. The Peltier element, therefore, uses a construction space which lies laterally next to the cooling duct, so that, despite the use of the Peltier element, the height of the cooling element does not increase by the amount of the overall height of the Peltier element. Accordingly, construction space is gained when both a cooling duct and a Peltier element are utilized. The Peltier element may also lie entirely within the height of the cooling duct, so that the height of the overall cooling element does not increase as a result of the Peltier element.

In accordance with embodiments, a battery system may include at least one of: a plurality of battery cells, and at least one cooling element to cool a component of the battery system, the cooling element having at least one of: a top cooling element part, a bottom cooling element part, at least one cooling duct, through which a cooling medium is capable of flowing, is arranged between the top cooling element part and bottom cooling element part, a Peltier element is arranged, resting against the bottom cooling element part, so as to lie at least partially at the height of the cooling duct.

In accordance with embodiments, a cooling element to cool a component of a battery system, the cooling element including at least one of: a top cooling element part; a bottom cooling element part spatially under the top cooling element part; at least one cooling duct between the top cooling element part and the bottom cooling element part, and through which a cooling medium is to flow; and a Peltier element arranged resting against the bottom cooling element part so as to lie at least partially at the height of the at least one cooling duct.

In accordance with embodiments, a cooling element to cool a component of a battery system, the cooling element comprising: a top cooling element part; a bottom cooling element part spatially under the top cooling element part, the bottom cooling element part defining spaced apart cooling ducts through which a cooling medium is to flow; a Peltier element arranged under the bottom cooling element part so as to lie at least partially at the height of a respective one of the cooling ducts; a carrier element upon which the Peltier elements rest; and heat insulation elements, each arranged between the carrier element and the bottom cooling element part, and upon which the bottom cooling element part rests.

In accordance with embodiments, a battery system includes at least one cooling element having a top cooling element part; a bottom cooling element part spatially under the top cooling element part; at least one cooling duct between the top cooling element part and the bottom cooling element part, and through which a cooling medium is to flow; and a Peltier element arranged resting against the bottom cooling element part so as to lie at least partially at the height of the at least one cooling duct.

Developments of the invention are specified in the dependent claims, the description and the accompanying drawings.

In accordance with embodiments, the cooling duct is shaped out through the bottom cooling element part, so that there is no need for a further component to form the duct and good thermal transfer becomes possible.

In accordance with embodiments, the top cooling element part is planar in cross-section, and thereby offers a good bearing surface for the component or components to be cooled, in particular battery cells.

In accordance with embodiments, the entire cooling element is preferably of flat form.

In accordance with embodiments, the cooling duct in the bottom cooling element part forms a step, and the Peltier element rests laterally against the step, so that the existing construction space is well utilized and good thermal transfer between the Peltier element and cooling duct becomes possible.

In accordance with embodiments, the Peltier element rests laterally on at least two sides against one or two cooling ducts. The lateral cooling ducts may be formed by a common duct which runs in various directions or may be formed by different ducts. In particular, it may be a question of an inflow and an outflow of the cooling medium. In particular, the ducts may rest against the Peltier element on two opposite sides of the Peltier element.

In accordance with embodiments, the Peltier element rests, on the side facing away from the bottom cooling element part, on a carrier element, in particular, on a tie-up carrier used for mounting the cooling element.

In accordance with embodiments, a heat insulation element is arranged between the carrier element and the bottom cooling element part. The formation of condensate on the bottom cooling element part may thereby be minimized.

In accordance with embodiments, the heat insulation element is arranged solely in regions in which there is no Peltier element arranged. The expression "regions" in this context means zones along the usually sheet-like extent of the bottom cooling element part, that is to say along the surface of the latter. The heat insulation element may, therefore, contact the bottom cooling element part since the bottom cooling element part is not contacted in these regions by a Peltier element. In particular, the heat insulation element may contact the bottom cooling element part in a region in which the bottom cooling element part forms a cooling duct.

In accordance with embodiments, the bottom cooling element part and/or the carrier element are/is designed to be electrically conductive. For this purpose, the respective component may be composed of an electrically conductive material, such as, for example, metal. Alternatively, the respective component may be composed of an insulating material, such as, for example, plastic having electrically conductive elements, such as, for example, rails or plates, being incorporated into the component.

DRAWINGS

Embodiments will be illustrated by way of example in the drawings and explained in the description below.

FIG. 1 illustrates a perspective view of a cooling element, in accordance with embodiments.

DESCRIPTION

As illustrated in FIG. 1, a cooling element in accordance with embodiments includes a cooler upper or top part 1 and a cooler lower or bottom part 2 spatially underneath the cooler upper part 1. Together the top cooling element part 1 and the bottom cooling element part 2 form a cooling plate. Arranged between the top cooling element part 1 and the bottom cooling element part 2 are a pair of cooling ducts 3, through which a cooling medium is capable of flowing. The cooling ducts 3 are formed by virtue of the shape of the bottom cooling element part 2. On and/or over the uppermost side of the planar top cooling element part 1, may be a component(s) to be cooled, such as, for example, one or more battery cells (not illustrated). The component(s) to be cooled may, for example, be arranged in contact with the top cooling element part 1.

Arranged to rest spatially underneath and against at least a portion of the bottom cooling element part 2 is Peltier element 4. The uppermost portion of the Peltier element 4 is to lie partially at the height of the cooling duct 3. The Peltier element 4 rests between and against respective sidewalls of the cooling ducts 3, illustrated on the left and on the right in FIG. 1.

The Peltier element 4 and heat insulation elements 6 rest on a carrier element 5, on the side facing away from the bottom cooling element part 2. The heat insulation elements 6 are arranged on the left and on the right of the Peltier element 4. Sidewalls of the heat insulation elements 6 are laterally in contact with a respective sidewall of the Peltier element 4. The uppermost surface of the heat insulation elements 6 are in contact with the bottommost surface of the cooling ducts 3 which are formed by the bottom cooling element part 2.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Top cooling element part
2 Bottom cooling element part
3 Cooling duct
4 Peltier element
5 Carrier element
6 Heat insulation element

What is claimed is:

1. A cooling element to cool a component of a battery system, the cooling element comprising:
   a top cooling element part;
   a bottom cooling element part spatially under the top cooling element part in a first direction;
   a cooling duct through which a cooling medium is to flow, inner walls of the cooling duct being defined by a lower surface of the top cooling element part and an upper surface of the bottom cooling element part; and
   a Peltier element arranged resting against the bottom cooling element part such that the cooling duct overlaps the Peltier element in the first direction, a height of the cooling duct in the first direction being less than a height of the Peltier element in the first direction.

2. The cooling element of claim 1, wherein the top cooling element part is planar in cross-section.

3. The cooling element of claim 1, wherein the bottom cooling element part forms a step which defines the cooling duct.

4. The cooling element of claim 3, wherein a sidewall of the Peltier element rests against the step.

5. The cooling element of claim 1, further comprising a carrier element upon which the Peltier element rests.

6. The cooling element of claim 5, wherein the carrier element is electrically conductive.

7. The cooling element of claim 5, wherein the bottom cooling element part and the carrier element are electrically conductive.

8. The cooling element of claim 5, further comprising a heat insulation element arranged between the carrier element and the bottom cooling element part.

9. The cooling element of claim 8, wherein the heat insulation element is arranged between the carrier element and the bottom cooling element part solely in regions in which the Peltier element is not arranged.

10. The cooling element of claim 1, further comprising a heat insulation element upon which the bottom cooling element part rests.

11. The cooling element of claim 10, wherein the heat insulation element contacts the bottom cooling element part in a region of the bottom cooling element part that defines the cooling duct.

12. The cooling element of claim 1, wherein the bottom cooling element part is electrically conductive.

13. A cooling element to cool a component of a battery system, the cooling element comprising:
   a top cooling element part;
   a bottom cooling element part spatially under the top cooling element part, the bottom cooling element part defining spaced apart cooling ducts through which a cooling medium is to flow;
   a Peltier element arranged under the bottom cooling element part so as to lie at least partially at the height of a respective one of the cooling ducts;
   a carrier element upon which the Peltier elements rest; and
   heat insulation elements, each arranged between the carrier element and the bottom cooling element part, and upon which the bottom cooling element part rests.

14. The cooling element of claim 13, wherein the bottom cooling element part forms steps, each of which defines one of the cooling ducts.

15. The cooling element of claim 14, wherein sidewalls of the Peltier element rest against respective ones of the steps.

16. The cooling element of claim 13, wherein the carrier element and/or the bottom cooling element part is/are electrically conductive electrically conductive.

17. The cooling element of claim 13, wherein the heat insulation element is arranged between the carrier element and the bottom cooling element part solely in regions in which the Peltier element is not arranged.

18. The cooling element of claim 13, wherein the heat insulation element contacts the bottom cooling element part in a region of the bottom cooling element part that defines the cooling ducts.

19. A battery system comprising:
   a cooling element, the cooling element comprising:
      a top cooling element part;
      a bottom cooling element part spatially under the top cooling element part in a first direction;
      a cooling duct through which a cooling medium is to flow, inner walls of the cooling duct being defined by a lower surface of the top cooling element part and an upper surface of the bottom cooling element part; and
      a Peltier element arranged resting against the bottom cooling element part such that the cooling duct overlaps the Peltier element in the first direction, a height of the cooling duct in the first direction being less than a height of the Peltier element in the first direction.

* * * * *